C. H. MOCK.
Gridiron.

No. 80,831.

Patented Aug. 11, 1868.

Witnesses:

Inventor:

United States Patent Office.

C. H. MOCK, OF QUINCY, ILLINOIS, ASSIGNOR TO HIMSELF AND ISRAEL DIXON, OF SAME PLACE.

Letters Patent No. 80,831, dated August 11, 1868.

IMPROVEMENT IN GRIDIRONS.

*The Schedule referred to in these Letters Patent and making part of the same.*

TO ALL WHOM IT MAY CONCERN:

Be it known that I, C. H. Mock, of Quincy, in the county of Adams, and in the State of Illinois, have invented an Improvement in Spiders; and do hereby declare that the following is a full, clear, and exact description thereof, reference being had to the accompanying drawings, making a part of this specification, in which—

Figure 1:
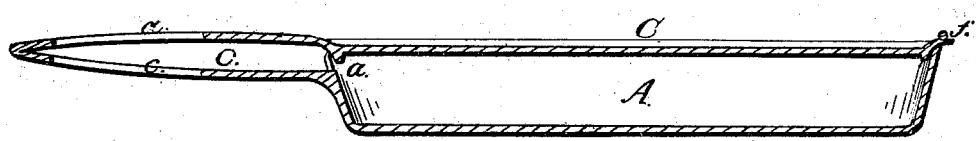
Figure 1 is a vertical section.
Figure 2:
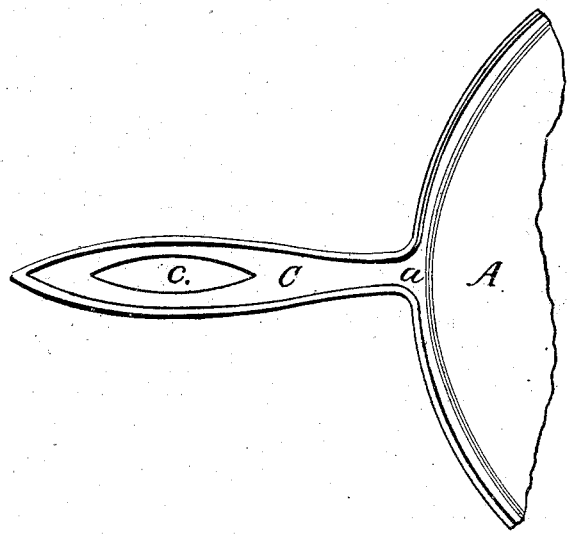
Figure 2 is a top view with the cover removed.

This invention is designed to furnish means for cooking meats, game, poultry, &c., without the use of butter or lard, and for retaining the juices which usually escape with the steam.

In the annexed drawings, A represents the spider, closely covered by the lid B, upon the front side of which is a projection, $b$, fitting into a staple upon the spider, holding the lid firmly in place.

Communicating with the interior of the spider at $a$, is a passage, C, formed by the handles of the spider and cover, for the admission of air which enters through the openings $c\ c$.

The operation of this spider is as follows, viz: The spider and lid are heated, the meat or other articles to be cooked, placed within, the lid closed, and the spider removed to the hearth.

The juices given off in the form of vapor, being retained within the spider by the closely-fitting cover, are condensed by the cool air entering through the passage C, and, settling upon the bottom of the spider, prevent burning, and render the meat or other food more tender, juicy, and of richer flavor.

Both spider and cover must be made of cast iron, in order that they may receive and retain sufficient heat to cook the food after the spider is removed from the fire.

I am aware that spiders have been made with a passage extending from the inside through the bottom, for the purpose of conveying into the flue of the stove the fumes arising from cooking, and disclaim such purpose in this invention, which is intended for the purpose only of saving the expense of butter, lard, &c., used in cooking meats and poultry, and also for retaining the juices given off in the form of vapor, by condensing them by means of cool air entering through the passage C.

Having thus fully set forth the nature and merits of my improvement, what I claim as my invention, and desire to secure by Letters Patent, is—

The spider A, cover B, projection and staple $b$, air-passage C, and openings $c\ c$, for the purpose substantially as herein shown and described.

In testimony that I claim the foregoing, I have hereunto set my hand, this 28th day of February, 1868.

C. H. MOCK.

Witnesses:
S. M. Rogers,
John H. Williams.